(12) United States Patent
Ponath et al.

(10) Patent No.: US 10,330,549 B2
(45) Date of Patent: Jun. 25, 2019

(54) CERAMIC PRESSURE MEASUREMENT CELL AND METHOD FOR PRODUCTION THEREOF

(71) Applicant: Endress + Hauser GmbH + Co. KG, Maulburg (DE)

(72) Inventors: Nils Ponath, Lorrach (DE); Andreas Rossberg, Bad Sackingen (DE)

(73) Assignee: ENDRESS+HAUSER SE+CO.KG, Maulburg (DE)

( * ) Notice: Subject to any disclaimer, the term of this patent is extended or adjusted under 35 U.S.C. 154(b) by 596 days.

(21) Appl. No.: 14/891,413

(22) PCT Filed: Apr. 22, 2014

(86) PCT No.: PCT/EP2014/058098
§ 371 (c)(1),
(2) Date: Nov. 16, 2015

(87) PCT Pub. No.: WO2014/183960
PCT Pub. Date: Nov. 20, 2014

(65) Prior Publication Data
US 2016/0097691 A1   Apr. 7, 2016

(30) Foreign Application Priority Data

May 17, 2013   (DE) .......... 10 2013 105 132

(51) Int. Cl.
*G01L 9/00*   (2006.01)
*B23K 35/36*   (2006.01)
(Continued)

(52) U.S. Cl.
CPC ........ *G01L 9/0075* (2013.01); *B23K 35/0238* (2013.01); *B23K 35/3606* (2013.01);
(Continued)

(58) Field of Classification Search
CPC .............. G01L 9/0075; B23K 35/0238; B23K 35/3602; B23K 35/3606; C04B 37/006; C04B 2237/127
(Continued)

(56) References Cited

U.S. PATENT DOCUMENTS 3,906,617 A * 9/1975 Behringer et al. ....... B05D 1/32
                                                          228/118
5,001,595 A   3/1991 Dittrich et al.
(Continued)

FOREIGN PATENT DOCUMENTS

CN   1469995 A   1/2004
CN   1809736 A   7/2006
(Continued)

OTHER PUBLICATIONS

Authors: Charles F. Burns, Jr. et al., Title: Critical Melting Points and Reference Data for Vacuum Heat Treating, Date: 2011, Publisher: Solar Atmospheres Inc., pp. 42 total.*

(Continued)

*Primary Examiner* — Andre J Allen
(74) *Attorney, Agent, or Firm* — Bacon & Thomas, PLLC

(57) ABSTRACT

A pressure measurement cell, comprising: a ceramic measurement membrane and a ceramic counterpart. The measurement membrane is joined to the counterpart in a pressure-tight manner forming a pressure chamber between the measurement membrane and the counterpart by means of an active brazing solder. The pressure measurement cell furthermore has a solder stop layer on a surface of the measurement membrane and/or the counterpart, wherein the solder stop layer has a metal oxide or a reduced form of the metal oxide. The metal oxide has at least one oxidation stage, which, assuming an activity coefficient of $R_{akt}=1$ at an inverse temperature of $8 \cdot 10^{-4}$/K, has an oxygen coexistence (Continued)

decomposition pressure of not less than $1^{-23}$ MPa ($10^{-23}$ bar) and not more than $1^{-12}$ MPa ($10^{-12}$ bar) and which, assuming an activity coefficient of $R_{akt}=1$, at an inverse temperature of $9 \cdot 10^{-4}$/K has an oxygen coexistence decomposition pressure of not less than $1^{-27}$ MPa ($10^{-27}$ bar) and not more than $1^{-15}$ MPa ($10^{-15}$ bar). Suitable metal oxides are, for example, oxides of chromium, tungsten or titanium.

9 Claims, 2 Drawing Sheets

(51) Int. Cl.
    *B23K 35/02*         (2006.01)
    *C04B 37/00*         (2006.01)

(52) U.S. Cl.
    CPC ...... *C04B 37/006* (2013.01); *C04B 2237/122* (2013.01); *C04B 2237/127* (2013.01); *C04B 2237/343* (2013.01); *C04B 2237/592* (2013.01); *C04B 2237/62* (2013.01)

(58) Field of Classification Search
    USPC .......................................................... 73/724
    See application file for complete search history.

(56) References Cited

U.S. PATENT DOCUMENTS

| | | | |
|---|---|---|---|
| 6,267,009 B1 * | 7/2001 | Drewes et al. ....... | G01L 9/0075 361/283.4 |
| 7,152,478 B2 | 12/2006 | Peterson et al. | |
| 7,360,428 B2 | 4/2008 | Banholzer et al. | |
| 2008/0277456 A1 * | 11/2008 | Gowda et al. ........... | B23K 3/06 228/215 |

FOREIGN PATENT DOCUMENTS

| | | | |
|---|---|---|---|
| CN | 103502787 A | 1/2014 | |
| DE | 3910646 A1 | 10/1990 | |
| DE | 102011011748 A1 | 8/2012 | |
| DE | 102011005665 A1 | 9/2012 | |
| EP | 0995979 A1 | 4/2000 | |
| EP | 1010973 A1 | 6/2000 | |
| WO | WO 2012055989 A1 * | 5/2012 | ......... B23K 35/0222 |

OTHER PUBLICATIONS

English Translation of Written Description of WO 2012055989A1, dated May 3, 2012, Publisher: European Patent Office, pp. 8 total.*
English Translation of International Preliminary Report on Patentability, WIPO, Geneva, dated Nov. 17, 2015, for PCT/ EP 2014/058098, 16 pages.
International Search Report,, EPO, The Netherlands, dated Sep. 12, 2014, for PCT/EP 2014/058098, 22 pages.
German Search Report, German PTO, Munich, dated Jun. 4, 2013, for DE 102013105132.4, 4 pages.
"Ellingham Diagrams," Massachusetts Institute of Technology, Mar. 30, 2009, http://web.mit.edu/2.813/www/readings/Ellingham_diagrams.pdf, 4 pp.

* cited by examiner

CERAMIC PRESSURE MEASUREMENT CELL AND METHOD FOR PRODUCTION THEREOF

TECHNICAL FIELD

The present invention relates to a ceramic pressure measurement cell and a method for production thereof.

BACKGROUND DISCUSSION

Generic ceramic pressure measurement cells have a ceramic measurement membrane and a ceramic counterpart, said measurement membrane is connected pressure-tight with the counterpart along a circumferential joint having an active brazing solder, wherein a pressure chamber is formed between the measurement membrane and the counterpart, wherein the equilibrium position of the measurement membrane arises from the difference between a pressure prevailing in the pressure chamber and a pressure acting on the outer side of the measurement membrane facing away from the pressure chamber. Generic pressure measurement cells also comprise a transducer for converting the pressure-dependent deformation of the measurement membrane into an electrical or optical signal. In the following, the pressure measurement cells with a capacitive transducer form the basis; this can equally be related to the invention of pressure measurement cells with that of other transducers.

In particular, aluminum oxide ceramics, which are suitable for the production of pressure measurement cells due to their elastic properties and their resistance to media, are used as the material for the base body and the measurement membrane. The ceramic components mentioned are joined, in particular, using an active brazing solder that preferably contains Zr—Ni—Ti. The production of such active brazing solder is disclosed, for example, in the European Published Patent Application EP 0490807 A2. According to the method described in the publication, rings that must be positioned between the measurement membrane and the base body to solder them together can especially be produced from the active brazing solder material.

However, the temperature range in which an active brazing solder forms a high-quality pressure-tight connection with a ceramic material is comparatively narrow.

At very low temperatures, the solder is not sufficiently reactive on the one hand and it is too viscous to spread evenly on a surface area to be wetted on the other. However, at too high temperatures, there is a risk that the solder has such a low viscosity that it enters areas that are not meant to be wetted by it.

However, in the production of larger batches of measurement cells, it is inevitable that a temperature distribution that exploits the available temperature range in an oven is given. Nevertheless, to obtain useful results, provision of a solder stop that limits the spread of the active solder is known.

To this end, for example, the published German patent application DE 100 36 433 A1 discloses a capacitive pressure measurement cell, which also has a joint with an active brazing solder, wherein on the base of the joint, namely the inner radius of the joint, an annular circumferential groove is formed, which prevents the localization of notch stresses at the joint on the one hand, and defines a reliable solder stop on the other, over which the active brazing solder cannot flow radially inwardly.

A practiced method for limiting the radially inwardly flowing active brazing solder is oxidation of the surface of a membrane-side electrode, which comprises tantalum, and should be in galvanic contact with the active brazing solder. At relatively low soldering temperatures, entry of the active brazing solder into the pressure chamber can be prevented with an acceptable yield. However, if the soldering temperature is increased, the solder stop no longer acts reliably, and the solder flows over the edge of the tantalum electrodes into the pressure chamber.

SUMMARY OF THE INVENTION

Therefore, the object of the present invention is to provide a pressure measurement cell and a method for production thereof, the pressure measurement cell has a reliable and simple solder stop, which especially acts even at an elevated temperature and wherein the preparation of this solder stop is implemented in the manufacturing process.

The object is achieved by the invention through the pressure measurement cell—according to independent claim 1 and the method according to the independent claim 7.

The pressure measurement cell according to the invention comprises a ceramic measurement membrane and a ceramic counterpart, said measurement membrane is joined pressure-tight with the counterpart, forming a pressure chamber between the measurement membrane and the counterpart by means of an active brazing solder, wherein on a surface of the measurement membrane and/or of the counterpart, said pressure measurement cell further comprises a solder stop layer, which prevents the active brazing solder from inwardly radially entering the pressure chamber via the solder stop layer when the measurement membrane is joined with the counterpart, wherein the solder stop layer comprises a metal oxide or a reduced form of the metal oxide according to the invention, said metal oxide comprises at least one oxidation step, which has an oxygen coexistence decomposition pressure of not less than $10^{-24}$ MPa ($10^{-23}$ bar) and not more than $10^{-13}$ MPa ($10^{-12}$ bar) at an inverse temperature of $8.10^{-4}$/K, obtained with an activity coefficient of $R_{akt}=1$ and an oxygen coexistence decomposition pressure of not less than $10^{-28}$ MPa ($10^{-27}$ bar) and not more than $10^{-16}$ MPa ($10^{-15}$ bar) at an inverse temperature of $9.10^4$/K, obtained with an activity coefficient of $R^{akt}=1$.

In another embodiment of the invention, the solder stop layer includes a possibly reduced oxide of chromium, tungsten or titanium.

The term of oxygen coexistence decomposition pressure and the plausibility of its relation with the present invention will be briefly explained in the following.

The reduction reaction or decomposition reaction of a metal oxide can be described as $2/y\ MeO_x = 2/y\ MeO_{x-y} + O_2$ wherein the equilibrium constant K is given for the above reaction as:

$$K = p_{O2} \cdot a^{2/y}(MeO_{x-y})/a^{2/y}(MeO_x)$$

If you consider that an activity coefficient $R_{akt}$ that is defined as $$R_{akt} := \left(\frac{a(MeO_{x-y})}{a(MeO_x)}\right)^{2/y}$$

can be approximated as $R_{akt}=$ for solids, then $K=p_{O2}$ i.e. the equilibrium constant corresponds to the oxygen coexistence decomposition pressure.

The equation $\Delta G_R = RT \cdot \ln K$ applies to the equilibrium constant K and the free reaction enthalpy $\Delta GR$.

Using the reaction enthalpy $\Delta H_R$ and the reaction entropy $\Delta S_R$, which are to be determined using the following equations:

$$\Delta H_R = 2/y \cdot \Delta H_B(MeO_{x-y}) + \Delta H_B(O_2) 2/y \cdot \Delta H_B(MeO_x)$$

$$\Delta S_R = 2/y \cdot S_B(MeO_{x-y}) + S_B(O_2) 2/y \cdot S_B(MeO_x)$$

from the values for the enthalpy of formation $\Delta H_B$ and the entropy of formation $S_B$ the oxygen coexistence decomposition pressure $p_{O2}$ can be determined, based on the equation $$\Delta G_R = \Delta H_R - T \Delta S_R$$

as:

$$\ln p_{O2} = \Delta S_R/R - \Delta H_R/(R \cdot T).$$

The experimental finding is that metal oxides form a reliable solder stop with the oxygen coexistence decomposition pressures defined above. Metal oxide systems, whose oxygen coexistence decomposition pressure is entirely outside of this range, do not lead to corresponding results.

The presumption for plausibility of the invention is that the metal oxides release oxygen to the liquid active brazing solder, thereby contributing to its slagging, so that it cannot flow any further. Metal oxides of more precious metals, which have a very high oxygen coexistence decomposition pressure are reduced to pure metal even at the solder temperatures, so that they can no longer deliver oxygen needed for slagging to the active solder.

In another embodiment of the invention, the solder stop layer has a width of not more than 0.4 mm, in particular, not more than 0.2 mm, and especially not more than 0.1 mm.

In another embodiment of the invention, the solder stop layer has a thickness of not more than 0.2 micron, in particular, no more than 0.1 micron and especially not more than about 50 nm.

According to another embodiment of the invention, the ceramic material of the measurement membrane and the base body comprise an aluminum oxide-ceramic, in particular, a high-purity aluminum oxide ceramic, as described in, for example the German patent DE 10 2008 036 381 B3. The grades of purity described therein relate, in particular, to ceramic of the measurement membrane, whereas such a high-purity ceramic is not mandatory for the base body.

According to an embodiment of the invention, the active brazing solder comprises a zirconium-nickel-titanium-containing active brazing solder, as described, for example in the EU patent application EP 0 490 807 A2.

The inventive method for bonding two ceramic components using an active brazing solder comprises: providing the two ceramic components; preparing a solder stop layer on at least one surface of at least one ceramic component, which separates a portion of the surface to be wetted by the solder from a portion to be kept free of the solder; providing the active brazing solder between the first and the second ceramic component in the surface areas of the first and of the second component to be wetted by the active brazing solder; heating the ceramic components and the active brazing solder under vacuum up to a temperature at which the active brazing solder melts and reacts with the ceramic components; and allowing the ceramic components to cool down, wherein the solder stop layer according to the invention comprises a metal oxide, which has an oxygen coexistence decomposition pressure of not less than 1-23 MPa (10-23 bar) and not more than 1-12 MPa (10-12 bar) at an inverse temperature of $8 \cdot 10^{-4}/K$ and an oxygen coexistence decomposition pressure of not less than $10^{-23}$ MPa ($10^{-23}$ bar) and not more than $10^{-13}$ MPa ($10^{-12}$ bar) at an inverse temperature of $9 \cdot 10^{-4}/K$ $10^{-28}$ MPa ($10^{-27}$ bar) $10^{-16}$ MPa ($10^{-15}$ bar).

In one embodiment of the invention, the solder stop layer comprises an oxide of titanium, chromium or tungsten, in particular, $TiO_2$, $Ti_4O_7$, $Cr_2O_3$, $WO_3$ and/or $WO_2$.

In another embodiment of the invention, the preparation of the solder stop layer includes sputtering or vapor deposition of the metal and subsequent oxidation.

In another embodiment of the invention, the oxidation is carried out by heating in an oxygen-containing atmosphere, for example in air, said oxidation takes place by heating to a temperature of not less than 500° C., in particular, not less than 600° C.

In another embodiment of the invention, wherein the joining of the ceramic components with the active brazing solder material takes place at a temperature of not less than 800° C., in particular, not less than 840° C.

In another embodiment of the invention, the solder stop layer separates a convex surface section that is not to be wetted by the active brazing solder material from a surface section that is to be wetted by the active brazing solder.

In one embodiment of the inventive method for producing a pressure measurement cell, the first ceramic component comprises a counterpart and the second ceramic component a measurement membrane, wherein the counterpart is connected pressure-tight with the measurement membrane by means of a joint.

In one embodiment of the invention, the active brazing solder is provided as an annular molded part between the base body and the measurement membrane, wherein the vacuum solder process involves heating to a temperature above 840° C., especially above 880° C. or 900° C.

BRIEF DESCRIPTION OF THE DRAWINGS

The invention is now disclosed with reference to the exemplary embodiments illustrated in the drawings.

Illustrated are.

DETAILED DISCUSSION IN CONJUNCTION WITH THE DRAWINGS

Figure 1:
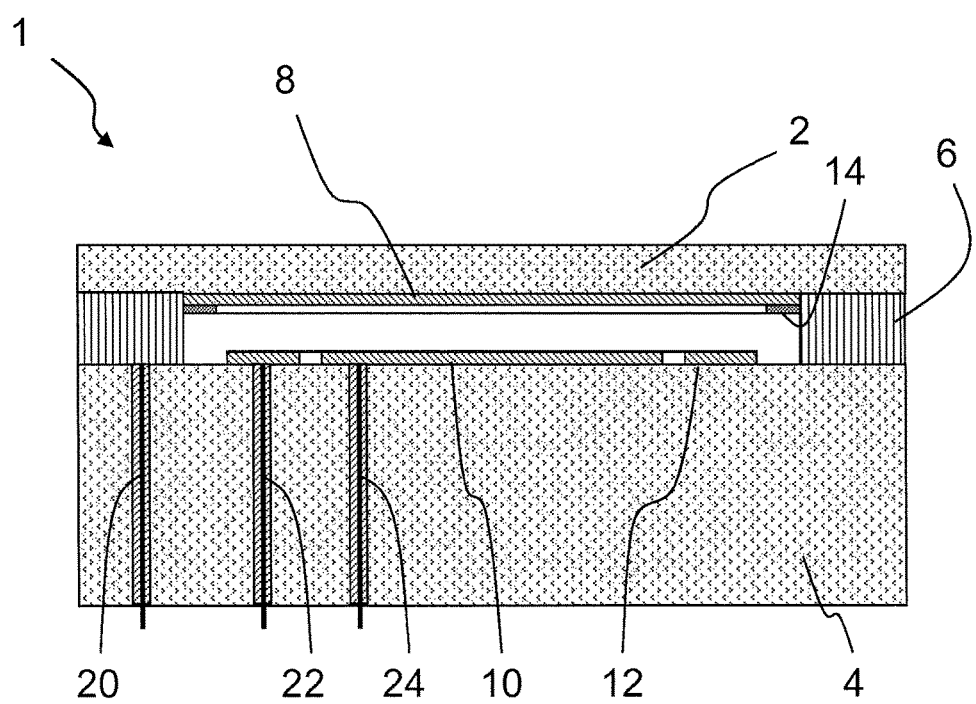
FIG. 1: is a longitudinal section of a pressure measurement cell according to the invention.

The pressure measurement cell 1 shown in FIG. 1 comprises a measurement membrane 2, which has high-purity (>99%) aluminum oxide, and a counterpart 4, which also comprises aluminum oxide. The counterpart 4 may have the same purity as that of the measurement membrane, wherein this is not absolutely necessary because the body is not in contact with the medium on the one hand, so that the requirements for corrosion resistance are low and the body is not exposed to mechanical stresses, such as the measurement membrane 2 on the other hand. The measurement membrane is joined pressure-tight with the counterpart along a circumferential joint 6, which has a Zr—Ni—Ti-containing active solder, thereby forming a pressure chamber between the measurement membrane 2 and the counterpart 4.

For detecting a pressure-dependent deformation of the measurement membrane 1, the pressure measurement cell comprises a differential capacitor, which is formed by a membrane electrode 8 that is arranged on the measurement membrane 2, a central main body-sided, circular disk-shaped measurement electrode 10 and a reference electrode 12 surrounding the measurement electrode. Ideally, the capacitance values between the measurement electrode 10 and the membrane electrode 8 is equal to the capacitance between the reference electrode 12 and the membrane electrode 8, if the measurement membrane 2 is in the rest position. The membrane electrode 8 preferably comprises platinum, wherein the reference electrode and the measurement electrode can also comprise platinum or tantalum.

If tantalum electrodes are used, they must be stabilized by thermal oxidation.

The membrane electrode 8 is electrically contacted via the joint 6, and an electrical feedthrough 20 that extends along the radial area of the joint 6 through the base body. The measurement electrode 10 and the reference electrode 12 are contacted directly by the counterpart 4 via electrical feedthroughs 22, 24. The electrical feedthroughs 20, 22, 24 comprise, for example tantalum pins, which are soldered pressure-tight in boreholes through the counterpart 4 by means of an active brazing solder.

The pressure measurement cell further comprises a solder stop layer 14, with which the active brazing solder is prevented from flowing radially inwardly out of the edge area into the pressure chamber during soldering of the counterpart 4 and the measurement membrane 2. The solder stop layer 14 comprises a metal oxide layer, esp. a layer that comprises highly oxidized titanium, for example, $TiO_2$ and/or $Ti_4O_7$ prior to soldering. The solder stop layer was prepared by sputtering titanium onto the metallic material of the membrane electrode and subsequent thermal oxidation at 600° C. in air. As shown in the drawings, an annular solder stop layer 14 is sufficient. However, the surface area of the membrane electrode that is not to be coated must be masked to achieve the ring shape. If this masking is omitted, it leads to a really unnecessary but harmless full-surface coating of the metallic membrane electrode. 8

If the membrane electrode 8 comprises platinum, it is not affected by the thermal oxidation of the solder stop layer.

If the membrane electrode comprises tantalum 8, the thermal oxidation can be carried out in a common step with the oxidation of the titanium of the solder stop layer 14.

By means of FIGS. 2a-2d, the manufacturing steps for producing the pressure measurement cell according to the invention are now briefly described.

Figure 2A:
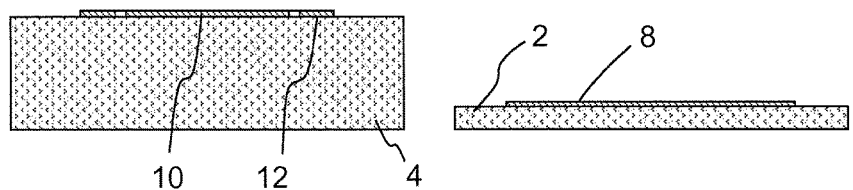
FIG. 2*a*-FIG. 2*d*: are a sequence of preparatory steps for manufacturing a pressure measurement cell according to the invention.

First, as shown in FIG. 2a, the surfaces of the membrane electrode 8, the measurement electrode 10 and the reference electrode 12 are deposited on the counterpart 4 and the measurement membrane 2 by sputtering of metals.

For the membrane electrode 8, platinum is preferred, while the base body-sided measurement electrode 10 and the surrounding reference electrode 12 preferably comprises tantalum, wherein the tantalum-containing electrodes must be stabilized by thermal oxidation.

Figure 2B:
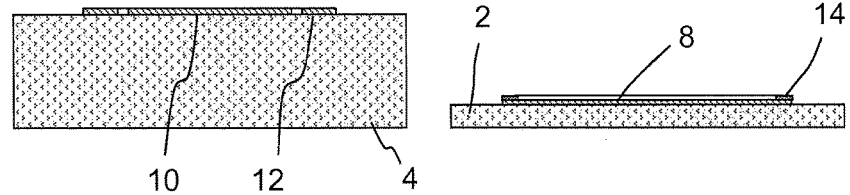

An annular solder stop layer 14 is prepared on the membrane electrode by first depositing titanium on an annular edge region of the measuring electrode 8 is deposited by sputtering, as shown in FIG. 2b. The outer radius defines the limit for the flow of the active brazing solder.

The titanium layer 14 has a thickness of, e.g. about 100 nm. It is completely oxidized in air at a temperature of about 600° C.

Figure 2C:
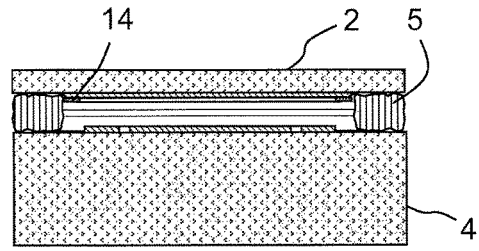

To prepare the joining of the measurement membrane 2 with the counterpart 4, the two elements to be joined are coaxially stacked with an annular solder preform 5 in between, as shown in FIG. 2c. The annular solder preform 5 has a height of, e.g. about 30 to 50 microns.

Finally, the components are soldered in a high-vacuum solder process at temperatures, for example 950° C., wherein the molten active brazing solder reacts with the ceramic surfaces of the measurement membrane 2 and the counterpart 4, but it cannot flow over the solder stop layer 14 into the pressure chamber, since the oxygen from the titanium oxide at least partly enters the solder, and thus, the slags solder so that it solidifies or becomes highly viscous and does not flow further into the pressure chamber. Nevertheless, a galvanic contact is established between the joint 6 and the membrane electrode 8, so that a metallic coating on an outer surface of the pressure measurement cell can be brought into contact with the membrane electrode 8 over the joint.

Figure 2D:
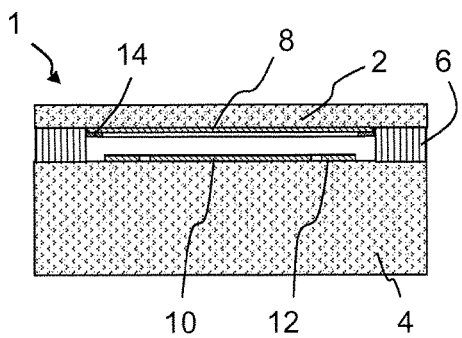

This results in the pressure measurement cell shown in FIG. 2d.

Of course, this also includes the electrical feedthroughs described in connection with FIG. 1, but have been omitted in FIGS. 2a to 2d for reasons of clarity. The feedthroughs are also soldered into the high-vacuum solder process.

In particular, drawing to scale has been omitted for the height ratios in the drawings to allow illustration of the layers, in particular. The pressure measurement cell has a radius of about 10 mm. The height or axial thickness of the counterpart is, for example 3 to 15 mm. The thickness of the measurement membrane is, for example not less than 100 microns, and no more than 2,000 microns. The layer thickness of the electrodes is about 100 nm. These dimensions are merely illustrative and are not to be considered for the definition or strict interpretation of the invention.

The invention claimed is:

1. A method of bonding two ceramic components using an active brazing solder, comprising:
   providing the two ceramic components;
   preparing a solder stop layer on at least one surface of at least one ceramic component, which separates a portion of the surface to be wetted by the solder from a portion to be kept free of the solder;
   providing the active brazing solder between the first and the second ceramic component in the surface areas of the first and of the second component to be wetted by the active brazing solder;
   heating the ceramic components and the active brazing solder under vacuum up to a temperature at which the active brazing solder melts and reacts with the ceramic components; and
   allowing the ceramic components to cool down, wherein:
   the solder stop layer comprises a metal oxide, which has an oxygen coexistence decomposition pressure of not less than $10^{-24}$ MPa ($10^{-23}$ bar) and not more than $10^{-13}$ MPa ($10^{-12}$ bar) at an inverse temperature of $8 \cdot 10^{-4}$/K and an oxygen coexistence decomposition pressure of not less than $10^{-28}$ MPa ($10^{-27}$ bar) and not more than $10^{-16}$ MPa ($10^{-15}$ bar) at an inverse temperature of $9 \cdot 10^{-4}$/K;
   for producing a pressure measurement cell, the first ceramic component comprises a counterpart and a second ceramic component comprises a measurement membrane, wherein the counterpart is connected pressure-tight with the measurement membrane by means of a joint, formed by said active brazing solder;
   the ceramic material of said measurement membrane and said counterpart comprise an aluminum oxide ceramic;
   said active brazing solder comprises a Zi-Ni—Ti— containing active brazing solder; and
   said solder stop layer has a thickness of no more than 0.2 micron;

wherein the preparation of the solder stop layer comprises sputtering or gas phase deposition of the metal, followed by oxidation; and wherein the oxidation is carried out by heating in an oxygen-containing atmosphere, and said oxidation takes place by heating to a temperature of not less than 500° C.

2. The method according to claim 1, wherein:
the solder stop layer comprises an oxide of titanium, chromium or tungsten.

3. The method according to claim 1, wherein:
the joining of the ceramic components with the active brazing solder material takes place at a temperature of not less than 800° C.

4. The method according to claim 1, wherein:
the solder stop layer separates a convex surface section that is not to be wetted by the active brazing solder material from a surface section that is to be wetted by the active brazing solder.

5. The method according to claim 1, wherein: the solder stop layer comprises $TiO_2$, $Ti_4O_7$, $Cr_2O_3$, $WO_3$ and/or $WO_2$.

6. The method according to claim 1, wherein: said oxidation takes place by heating to a temperature of not less than 600° C.

7. The method according to claim 1, wherein: the oxidation is carried out by heating in air.

8. A method of bonding two ceramic components using an active brazing solder, comprising:
providing the two ceramic components;
preparing a solder stop layer on at least one surface of at least one ceramic component, which separates a portion of the surface to be wetted by the solder from a portion to be kept free of the solder;

providing the active brazing solder between the first and the second ceramic component in the surface areas of the first and of the second component to be wetted by the active brazing solder;

heating the ceramic components and the active brazing solder under vacuum up to a temperature at which the active brazing solder melts and reacts with the ceramic components; and allowing the ceramic components to cool down, wherein:

the solder stop layer comprises a metal oxide, which has an oxygen coexistence decomposition pressure of not less than $10^{-24}$ MPa ($10^{-23}$ bar) and not more than $10^{-13}$ MPa ($10^{-12}$ bar) at an inverse temperature of $8 \cdot 10^{-4}$/K and an oxygen coexistence decomposition pressure of not less than $10^{-28}$ MPa ($10^{-27}$ bar) and not more than $10^{-16}$ MPa ($10^{-15}$ bar) at an inverse temperature of $9 \cdot 10^{-4}$/K, the preparation of the solder stop layer comprises sputtering or gas phase deposition of the metal, followed by oxidation, and the oxidation is carried out by heating in an oxygen-containing atmosphere, and said oxidation takes place by heating to a temperature of not less than 500° C.

9. The method of claim 8, wherein the oxidation is carried out by heating in air.

* * * * *